United States Patent
Peeters et al.

(10) Patent No.: US 9,674,165 B2
(45) Date of Patent: Jun. 6, 2017

(54) EFFICIENT KEY DERIVATION WITH FORWARD SECRECY

(71) Applicant: NXP B.V., Eindhoven (NL)

(72) Inventors: Michael Michel Patrick Peeters, Leuven (BE); Rudi Verslegers, Leuven (BE); Dimitri Warnez, Hamburg (DE)

(73) Assignee: NXP B.V., Eindhoven (NL)

( * ) Notice: Subject to any disclaimer, the term of this patent is extended or adjusted under 35 U.S.C. 154(b) by 19 days.

(21) Appl. No.: 14/724,315

(22) Filed: May 28, 2015

(65) Prior Publication Data
US 2016/0352706 A1    Dec. 1, 2016

(51) Int. Cl.
*H04L 29/06*    (2006.01)
*H04L 9/08*    (2006.01)

(52) U.S. Cl.
CPC .......... *H04L 63/061* (2013.01); *H04L 9/0861* (2013.01); *H04L 63/062* (2013.01)

(58) Field of Classification Search
CPC ..................................... H04L 63/061
USPC ........................................ 713/171
See application file for complete search history.

(56) References Cited

U.S. PATENT DOCUMENTS

| | | | | |
|---|---|---|---|---|
| 7,266,842 B2* | 9/2007 | Foster | .................... | G06F 21/85 713/190 |
| 7,817,802 B2* | 10/2010 | Kitaj | .................... | H04L 9/0822 380/281 |
| 8,578,162 B2* | 11/2013 | Jentzsch | ................. | G06F 7/582 713/168 |
| 8,996,873 B1* | 3/2015 | Pahl | ...................... | H04L 63/061 713/168 |
| 9,087,212 B2* | 7/2015 | Balakrishnan | ...... | G06F 21/6227 |
| 9,197,616 B2* | 11/2015 | Sinha | ..................... | H04L 63/06 |
| 2007/0003063 A1 | 1/2007 | Smith et al. | | |
| 2015/0019442 A1* | 1/2015 | Hird | .................... | G06Q 20/3829 705/71 |

OTHER PUBLICATIONS

"EMV Integrated Circuit Card Specifications for Payment Systems", EMV 4.3 standard, book 2—security and key management, Nov. 2011 [http://resources.unitedthinkers.com/specifications/emv/emv2/EMV_v4.3_Book_2_Security_and_Key_Management_20120607061923900.pdf] [viewed on May 28, 2015].
"GlobalPlatform Card Technology, Secure Channel Protocol '11', Card Specification v2.2—Amendment F, v0.0.0.12", Secure Channel Protocol '11'—Public Review v0.0.0.12, Dec. 2014.
Kocher, et al., "Introduction to differential power analysis", J Cryptogr Eng (2011) 1:5-27.
Mangard, et al., "Power Analysis Attacks", Springer 2007, SBN 978-0-387-38162-6.
Paul, et al., "FIPS 140-2 Non-Proprietary Security Policy", Cloakware, Inc. Cloakware Security Kernel.Software Version: 1.0.

(Continued)

*Primary Examiner* — Longbit Chai

(57) ABSTRACT

Various embodiments relate to a method, device, and non-transitory medium including: determining a master key value for use in secure communications with a different device, wherein the master key value is used as a master key; deriving at least one session key using the master key; generating a new master key value based on the master key; deleting the current master key value; and using the new master key value as the master key.

20 Claims, 4 Drawing Sheets

(56) References Cited

OTHER PUBLICATIONS

Barker, Elaine, et al., "NIST Special Publication 800-57: Recommendation for Key Management Part 1: General, revision 3", Jul. 2012.
Menezes, A.J., et al., "Key Management Techniques ED", Handbook of Applied Cryptography, CRC Press, pp. 543-590; Oct. 1996.
Extended European Search Report dated Oct. 18, 2016 in EP Application No. 16169448.4.

* cited by examiner

EFFICIENT KEY DERIVATION WITH FORWARD SECRECY

TECHNICAL FIELD

Various embodiments disclosed herein relate generally to secure channel communications and, more particularly but not exclusively, to session key derivation and master key secrecy.

BACKGROUND

When two devices want to communicate securely, they typically first establish a secure channel. This channel will provide protection for confidentiality, integrity, and/or authentication of the exchanged messages. The method of choice to implement this secure channel is usually based on symmetric cryptography. In that setting, both devices first share a common and secret symmetric key usually called the master key. The master key is typically either predefined at manufacturing time or obtained via public key-based key exchange protocols (for instance elliptic curve Diffie-Hellman). In well-designed secure channels, the master key is never used as-is to encrypt, authenticate, or sign the messages. Instead, the master key is used to generate so-called session keys that are then each dedicated to a particular task (like encryption or authentication) for a limited period of time.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a non-transitory machine-readable medium encoded with instructions for execution by a processor, the non-transitory machine-readable medium including: instructions for determining a master key value for use in secure communications with a different device, wherein the master key value is used as a master key; instructions for deriving a session key using the master key; instructions for generating a new master key value based on the master key; instructions for deleting the current master key value; and instructions for using the new master key value as the master key.

Various embodiments described herein relate to a device for participating in a secure communication session, the device including: a memory; an interface to another device with which secure communication will occur; and a processor in communication with the interface and memory, the processor being configured to determine a master key value for use in secure communications with a different device, wherein the master key value is used as a master key, derive a session key using the master key, generate a new master key value based on the master key, delete the current master key value, and use the new master key value as the master key.

Various embodiments described herein relate to a method by a processor, the method including: determining a master key value for use in secure communications with a different device, wherein the master key value is used as a master key; deriving a session key using the master key; generating a new master key value based on the master key; deleting the current master key value, and using the new master key value as the master key.

Various embodiments are described wherein the instructions for generating a new master key value based on the master key include: instructions for combining the session key with at least one additional session key derived using the master key to form the new master key value.

Various embodiments are described wherein the instructions for generating a new master key value based on the master key include: instructions for combining the current master key value with at least the session key to form the new master key.

Various embodiments are described wherein the instructions for generating a new master key value include instructions for encrypting a constant value using the master key.

Various embodiments are described wherein the instructions for generating a new master key value include instructions for applying an XOR function to two or more cryptographic keys.

Various embodiments are described wherein the instructions for deriving at least one session key using the master key include: instructions for encrypting at least one constant value using the master key.

Various embodiments are described wherein the instructions for deriving at least one session key using the master key include: instructions for combining the current value of the master key with the new value of the master key to produce a session key.

Various embodiments additionally include instructions for periodically re-executing the instructions for generating a new master key.

Various embodiments are described wherein the instructions for negotiating a master key value with a different device include instructions for negotiating with a secure element that is part of the same device as the processor.

Various embodiments are described wherein the non-transitory machine-readable medium is encoded with instructions for execution by a secure element within a host device.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

As noted above, many secure communications implementations utilize a shared master key between devices which is then used to generate session keys that are actually used for tasks such as encryption and digital signing. If the master key is compromised, however, an attacker will be able to generate the session keys themselves and access the content of any intercepted communications, including both future and past communications.

Various embodiments described herein attempt to provide forward secrecy for secured communications by periodically altering the master key and discarding all old versions of the master key. Both parties to a communication alter the master key in the same way, such that renegotiation of the master key need not be performed; instead, both devices modify the master key according to the same protocol and therefore always hold the same version of the master key. In this way, even if the current master key is compromised, the attacker does not have access to previous versions of the master key and therefore may not be able to decrypt previously-intercepted communications.

Figure 1:
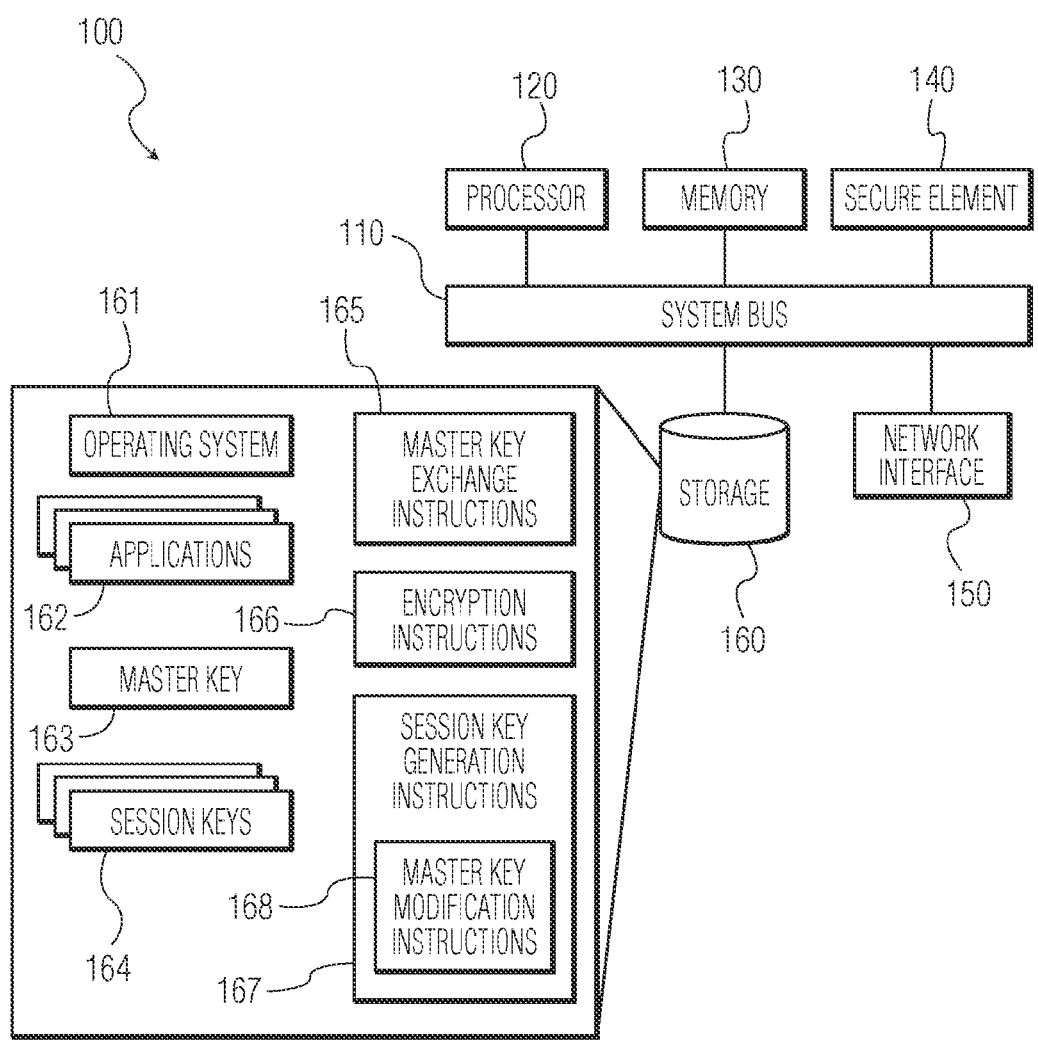
FIG. 1 illustrates an example of a hardware system for performing secure communications.

FIG. 1 illustrates an example of a hardware system 100 for performing secure communications. The hardware system 100 may be virtually any device that communicates using an encrypted protocol. As shown, the device 100 includes a processor 120, memory 130, secure element 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The secure element 140 may be a device for performing secured functions such as, for example, storing secret information or performing cryptographic processing. As such, the secure element 140 may include hardware such as a processor, a memory, and an interface to the bus 110. The rest of the hardware device 100 may be referred to as a host device to the secure element. In various embodiments, the secure element 140 and processor 120 both implement a session key derivation method, such as one of the examples described herein, to enable secure communications therebetween. Alternatively, only one of the secure element 140 and processor 120 may implement such a method along with another external device which is accessible via the network interface.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Additionally or alternatively, the network interface may include a near-field communication (NFC) chip, 3G chip, or 4G chip along with appropriate antennas to enable wireless communications. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100 and multiple applications 162 for performing various functions on behalf of the user. For example, the applications 162 may include a web browser, a music player, or a wireless payment application (or a non-secured portion thereof, with the secured portion residing on the secure element 140).

To enable secure communications (e.g. with the secure element 140 or via the network interface 150), the storage 160 also stores a master key 163 and multiple session keys 164. In various embodiments, the initial value of the master key 163 is pre-configured as stored in the storage 160 at the time of device manufacturing while in other embodiments the initial value of the master key 163 is negotiated between two devices according to an appropriate key exchange protocol. In the latter embodiments, the storage 160 includes master key exchange instructions 165 that transmit a master key value to or receive a master key value from another device. The storage 160 also includes encryption instructions 166 such as, for example, an AES implementation that can be used in conjunction with the session keys 166 to encrypt communications.

Periodically, new session keys 164 are generated (at both ends of the secure communication channel) to reduce the likelihood that the session keys 164 will be compromised. As such, the storage 160 includes session key generation instructions 167. To provide forward secrecy, the session key generation instructions 167 also include master key modification instructions 168 that periodically alter the master key 163 value. For example, the master key modification instructions 168 may generate a new master key value and subsequently delete the current master key value by, for example, overwriting the current master key value with the new master key value or other data or by freeing an area in memory storing the current master key value. Various example embodiments of the session key generation instructions 167 and master key modification instructions 168 will be described below.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

Figure 2:
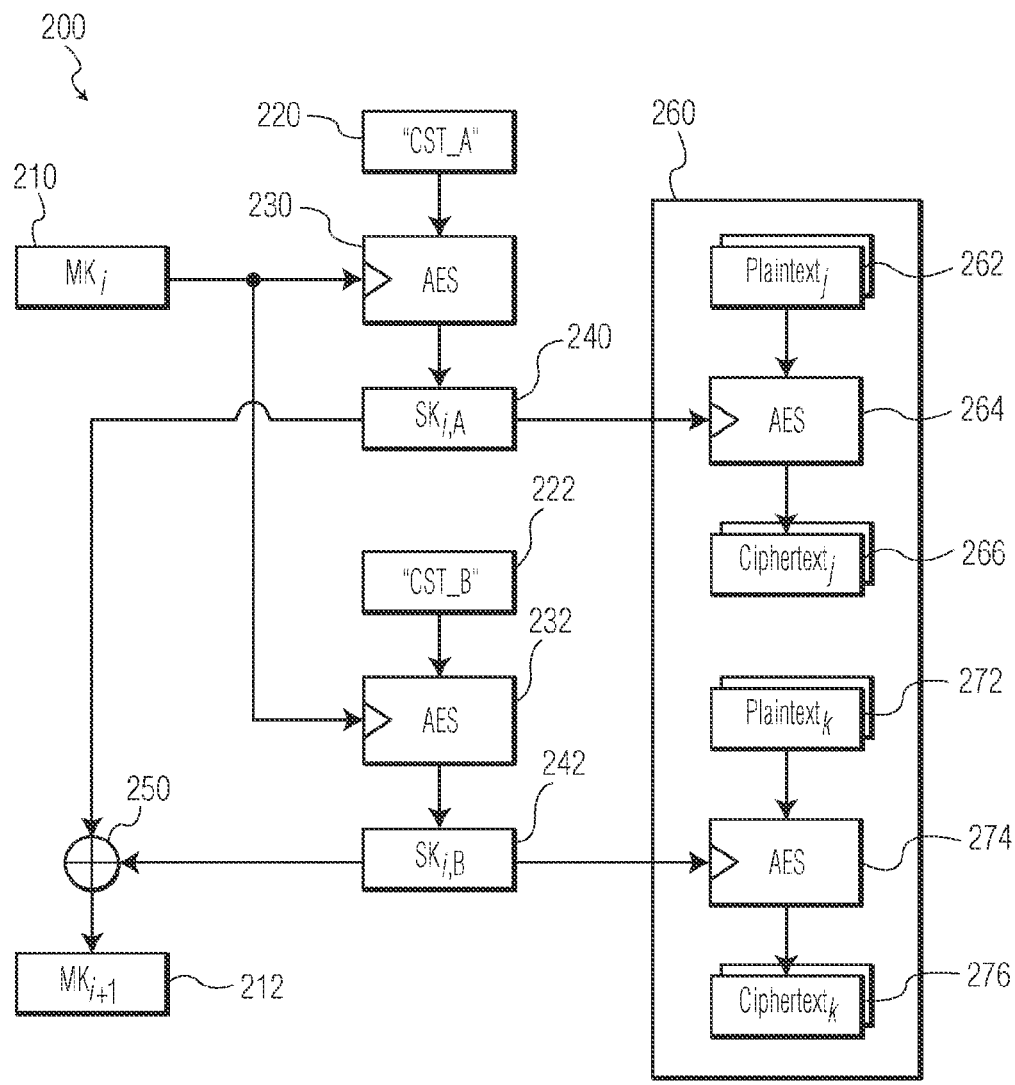
FIG. 2 illustrates a first example of a method for generating session keys and a new master key.

FIG. 2 illustrates a first example of a method 200 for generating session keys and a new master key. The method 200 may correspond to the session key generation instructions 167 of FIG. 1. As shown, the method 200 utilizes a current master key 210 to generate two session keys 240, 242. Specifically, the method 200 encrypts two constants 220, 222 using an AES encryption algorithm (e.g., in ECB mode applied to one block) 230, 232 and the current master key 210. The constants 220, 222 may be any values that two implementations of the method 200 agree will be used for generation of the session keys 240, 242. For example, these constants 220, 222 may be pre-configured literal values, agreed-upon variables, or a combination thereof. For example, "CST_A" 220 may be a counter value appended to a device identifier, while "CST_B" 222 may be a current time (e.g., the current hour and minute) appended to the device identifier. It will be apparent that virtually any value may be used as a constant 220, 222 as long as both parties to the communication are agreed as to which values will be used. In various embodiments, the selected constants need not be kept secret.

After the session keys 240, 242 have been generated, they may be used as part of ordinary cryptographic operations 260 performed by the operating system or applications. For example, as shown, the session keys 240, 242 may be used by other AES processes 264, 274 to encrypt plaintext 262, 272 for transmission to another device as ciphertext 266, 276 (or to decrypt ciphertext 266, 276 into usable plaintext 262, 274). It will be understood that additional session keys (not shown) may be generated in similar, agreed-upon manners.

Also after session key generation, the method 200 generates a new master key 212 to replace the current master key 210 by combining the two session keys 240, 242. Specifically, as shown, the session keys are combined using an exclusive or (XOR) operation 250. It will be appreciated that other combination functions may be used such as a not-and (NAND) operation, encryption of one session key using another, or any other transformative function. Additionally, it will be appreciated that more than two session keys may be combined to form the new master key value 212. For example, four session keys may be XOR'ed together to produce a single master key value.

After the new master key value 212 is generated, it replaces the old master key value 210. For example, the method may overwrite a master key variable or space in memory with the new value 212, thereby deleting the old master key value 210. By deleting the old master key value 210, the chances of the old master key value being compromised (and, consequently, the chances of the session keys 240, 242 being compromised) are reduced. As such, the method 200 provides forward secrecy. It will be appreciated that the method 200 may be executed periodically to refresh the session keys 240, 242 and, as such, the value of the master key may periodically change.

With knowledge of the method 200 used, an attacker that has compromised the session keys 240, 242 may generate the next master key 212 and, as such, may be able to generate each new session key in the future. To help combat this, various implementations may also utilize the old value of the master key in generating the new master key; as such, the attacker would also have to compromise the old value of the master key, which is generally protected using different, and often more stringent, techniques from those used to protect the session key.

Figure 3:
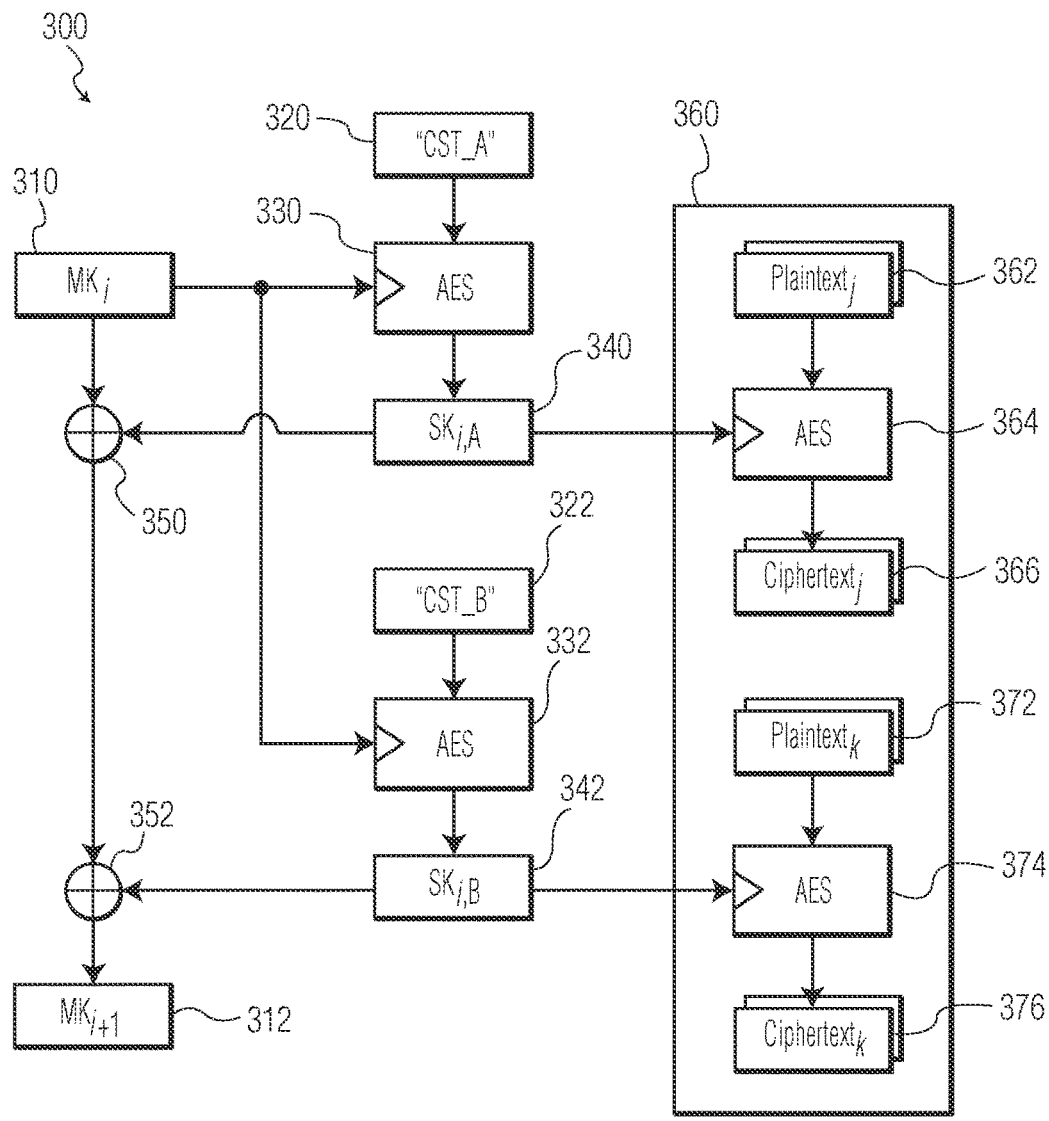
FIG. 3 illustrates a second example of a method for generating session keys and a new master key.

FIG. 3 illustrates a second example of a method 300 for generating session keys and a new master key. The method 300 may correspond to the session key generation instructions 167 of FIG. 1. As can be seen, the method 300 is largely similar to the previous example method 200. A master key 310 is used to encrypt 330, 332 agreed-upon constants 320, 322 to produce session keys 340, 342. The session keys 340, 342 may then be used for secure communication operations 360 by the OS or applications to, for example, encrypt 364, 374 plaintext communications 362, 372 to produce encrypted communications 366, 376 (or to perform the reverse process of decryption).

To produce a new master key value 312, the method 300 combines the old master key value 310 with one or more of the session keys 340, 342. As shown, the master key 310 is combined with a first session key 340 via an XOR operation 350, the result of which is then combined with a second session key 342 via another XOR operation 352. As before, fewer or additional session keys may utilized and alternative or additional combination techniques may be used.

Figure 4:
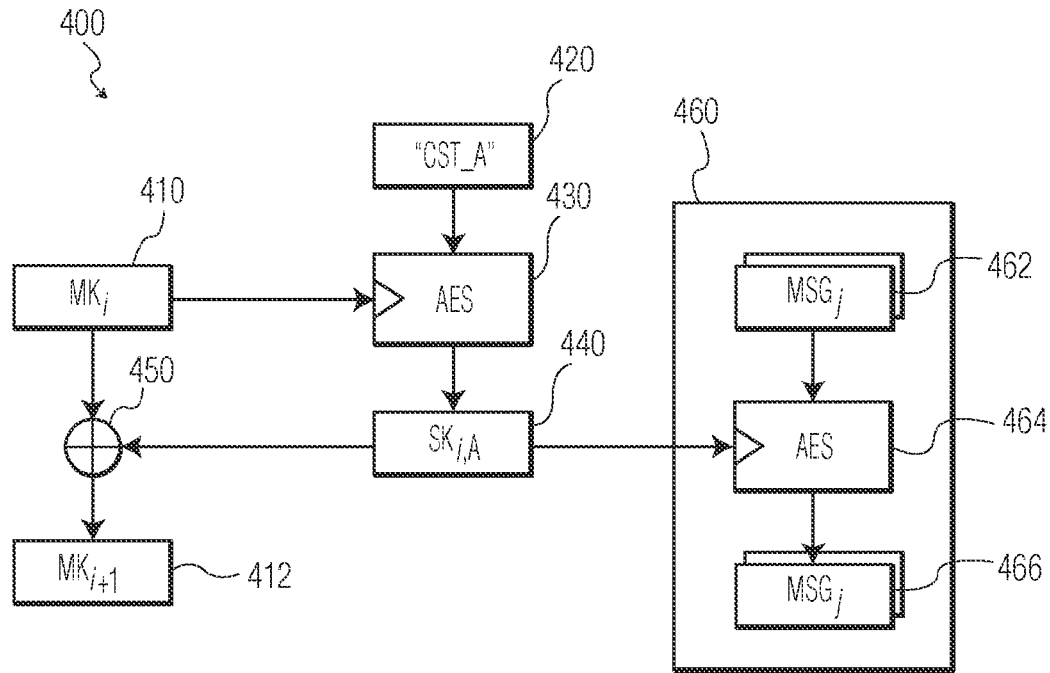
FIG. 4 illustrates a third example of a method for generating a session key and a new master key.

FIG. 4 illustrates a third example of a method 400 for generating a session key and a new master key. The method 400 may correspond to the session key generation instructions 167 of FIG. 1. As shown, the method is similar to the previous example method 300. The method 400 uses a master key 410 to encrypt 430 an agreed-upon constant 420 to produce a session key 440. The session key 440 may then be used for secure communication operations 460 by the OS or applications to, for example, encrypt 464 plaintext communications 462 to produce encrypted communications 466 (or to perform the reverse process of decryption).

To produce a new master key value 412, the method 400 combines the old master key value 410 with one session key 440. As shown, the combination operation is an XOR 450. As before, fewer or additional session keys may utilized and alternative or additional combination techniques may be used.

Thus, the third example method 400 is similar to the second example method 300 with the difference that the new master key 412 may be generated using only a single session key (and the old value for the master key). As such, the method 400 may be used to modify the master key after generation of each new session key. Alternatively, the method 400 may only be used to modify the master key when a session key for a specific function is generated. For example, if an implementation generates different session keys for encryption and authentication, the method 400 may only be used to change the master key whenever the session key for the encryption task (and not for the authentication task) is generated. Various other modifications will be apparent.

Figure 5:
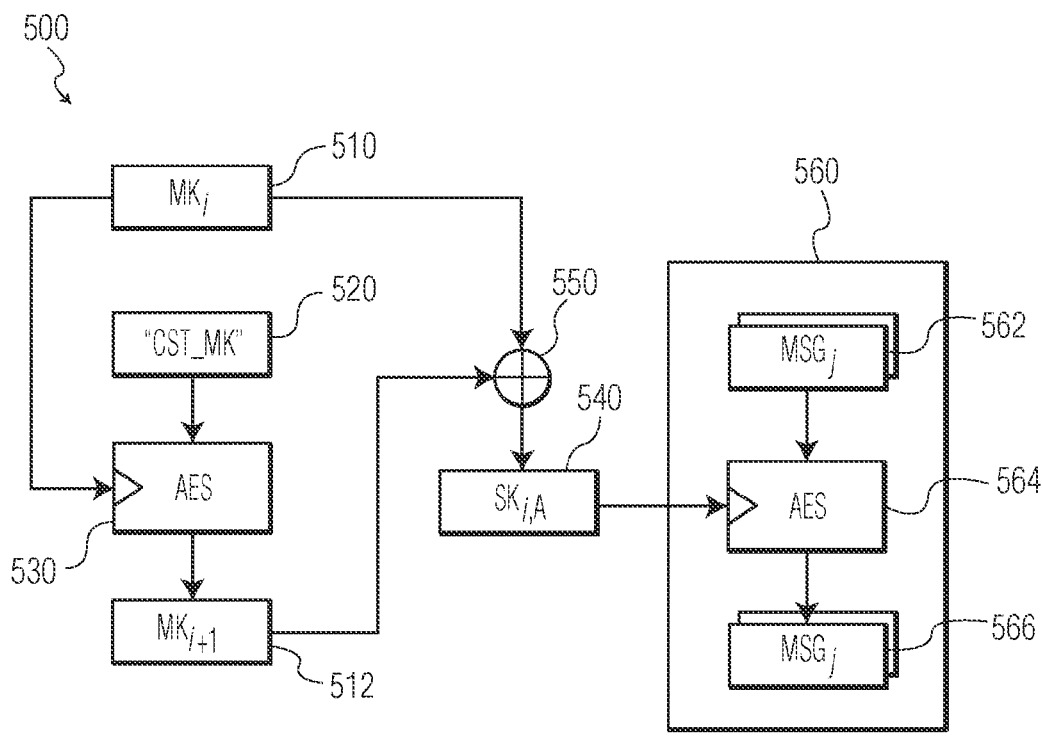
FIG. 5 illustrates a fourth example of a method for generating a session key and a new master key.

FIG. 5 illustrates a fourth example of a method 500 for generating a session key and a new master key. The method 500 may correspond to the session key generation instructions 167 of FIG. 1. This fourth example method 500 illustrates the use of a different combination function to create the new master key (as well as an alternative method to create a session key).

As shown, the method 500 first uses the current master key value 510 to generate a new master key value 512. Specifically, the method 500 encrypts 530 a constant value 520 that, as with previously-described constant values 220, 222, 320, 322, 420 is agreed-upon by the parties to the secure communication and between which the master key is shared. The result of the encryption step 530 is taken as the new value of the master key 512.

After the new master key 512 is generated, it can be used along with the old master key 510 to generate a new session key 540. Specifically, as shown, the two master keys 510, 512 are combined via an XOR operation 550 to produce a session key 540. The session key 540 may then be used for secure communication operations 560 by the OS or applications to, for example, encrypt 564 plaintext communications 562 to produce encrypted communications 566 (or to perform the reverse process of decryption). After the session key 540 is generated, the method 500 may delete the old master key value 510 to further guard against the value being compromised.

The method 500 may be used to modify the master key with the generation of each new session key. Alternatively, the method 500 may only be used to modify the master key when a session key for a specific function is to be generated. For example, if an implementation generates different session keys for encryption and authentication, the method 500 may only be used to change the master key whenever the session key for the encryption task (and not for the authentication task) is generated. As yet another alternative, the method 500 may be modified to not produce any session key at all, executing only the encryption operation 530 to generate the new master key 512. For example, the parties to the communication may be configured to periodically alter their master key based on such a modified method. Various other modifications will be apparent.

According to the foregoing, various embodiments enable the efficient derivation of session keys with the benefit of forward secrecy. For example, by periodically generating a new master key according to an agreed-upon process, the parties to a communication can provide forward secrecy to the master key without communicating each new master key to each other. Further, by using agreed-upon constants and simple combination operations to generate master and session keys, various embodiments are able to quickly and efficiently derive encryption keys necessary for secure communications. Such embodiments may be particularly beneficial in environments where secure communications are to be performed very quickly such as, for example, an "instant on" scenario (e.g., a mobile device is activated or unlocked by a fingerprint scan which is compared against a fingerprint key stored in a secure element of the mobile device). Various additional benefits will be apparent in view of the foregoing.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable medium encoded with instructions for execution by a processor device, the non-transitory machine-readable medium comprising:
   instructions for determining a master key value for use in secure communications with a different device, wherein the master key value is used as a master key;
   instructions for deriving a session key directly from the master key;
   instructions for generating a new master key value based on the master key and the session key;
   instructions for deleting a current master key value being used as the master key; and
   instructions for using the new master key value as the master key.

2. The non-transitory machine-readable medium of claim 1, wherein the instructions for generating a new master key value based on the master key comprise:
   instructions for combining the session key with at least one additional session key derived using the master key to form the new master key value.

3. The non-transitory machine-readable medium of claim 1, wherein the instructions for generating a new master key value based on the master key comprise:
   instructions for combining the current master key value with at least the session key to form the new master key.

4. The non-transitory machine-readable medium of claim 1, wherein the instructions for generating a new master key value comprise instructions for encrypting a constant value using the master key.

5. The non-transitory machine-readable medium of claim 1, wherein the instructions for generating a new master key value comprise instructions for applying an XOR function to two or more cryptographic keys.

6. The non-transitory machine-readable medium of claim 1, wherein the instructions for deriving at least one session key using the master key comprise:
   instructions for encrypting at least one constant value using the master key.

7. The non-transitory machine-readable medium of claim 1, wherein the instructions for deriving at least one session key using the master key comprise:

instructions for combining the current value of the master key with the new value of the master key to produce a session key.

8. The non-transitory machine-readable medium of claim 1, further comprising instructions for periodically re-executing the instructions for generating a new master key.

9. The non-transitory machine-readable medium of claim 1, wherein the instructions for negotiating a master key value with a different device comprise instructions for negotiating with a secure element that is part of the same device as the processor device.

10. The non-transitory machine-readable medium of claim 1, wherein the non-transitory machine-readable medium is encoded with instructions for execution by a secure element within a host device.

11. A device for participating in a secure communication session, the device comprising:
a memory;
an interface to another device with which secure communication will occur; and
a processor device in communication with the interface and memory, the processor device being configured to
determine a master key value for use in secure communications with a different device, wherein the master key value is used as a master key,
derive a session key directly from the master key,
generate a new master key value based on the master key and the session key,
delete a current master key value being used as the master key, and
use the new master key value as the master key.

12. The device of claim 11, wherein in generating a new master key value based on the master key, the processor device is configured to:
combine the session key with at least one additional session key derived using the master key to form the new master key value.

13. The device of claim 11, wherein in generating a new master key value based on the master key, the processor device is configured to:
combine the current master key value with at least the session key to form the new master key.

14. The device of claim 11, wherein in generating a new master key value, the processor device is configured to encrypt a constant value using the master key.

15. The device of claim 11, wherein in generating a new master key value, the processor device is configured to apply an XOR function to two or more cryptographic keys.

16. The device of claim 11, wherein in deriving at least one session key using the master key the, processor device is configured to:
encrypt at least one constant value using the master key.

17. The device of claim 11, wherein in deriving at least one session key using the master key, the processor device is configured to:
combine the current value of the master key with the new value of the master key to produce a session key.

18. The device of claim 11, wherein the processor device is further configured to periodically re-execute the step generating a new master key.

19. The device of claim 11, further comprising a secure element, wherein the secure element is the other device with which secure communication will occur.

20. The device of claim 11, wherein the device is a secure element to be installed in a host system, wherein the host system is the other device with which secure communication will occur.

* * * * *